United States Patent [19]

Watanabe et al.

[11] Patent Number: 4,473,286

[45] Date of Patent: Sep. 25, 1984

[54] AUTOMATIC FOCUSING DEVICE OF A CAMERA

[75] Inventors: Sakuji Watanabe, Warabi; Akira Ogasawara, Yokohama; Nobuhiko Terui; Ken Utagawa, both of Tokyo; Kunihisa Hoshino, Kawasaki, all of Japan

[73] Assignee: Nippon Kogaku K.K., Tokyo, Japan

[21] Appl. No.: 437,012

[22] Filed: Oct. 27, 1982

[30] Foreign Application Priority Data

Nov. 4, 1981 [JP] Japan ................................ 56/176758

[51] Int. Cl.³ .............................................. G03B 3/10
[52] U.S. Cl. .................................................... 354/406
[58] Field of Search ............................ 354/25, 31, 406

[56] References Cited

U.S. PATENT DOCUMENTS

| | | | |
|---|---|---|---|
| 4,090,209 | 5/1978 | Kondo | 354/25 |
| 4,303,321 | 12/1981 | Enomoto et al. | 354/25 |
| 4,336,450 | 6/1982 | Utagawa et al. | 354/25 UX |
| 4,382,665 | 5/1983 | Eguchi et al. | 354/25 |

Primary Examiner—Michael L. Gellner
Attorney, Agent, or Firm—Fitzpatrick, Cella, Harper & Scinto

[57] ABSTRACT

A camera capable of automatic focusing operation includes a picture-taking lens, photoelectric detector elements for photoelectrically detecting the light from an object to be photographed, a picture-taking lens driving device for driving the picture-taking lens to the in-focus position on the basis of the output of the photoelectric detector elements, a drive blocking device for detecting that the object is unsuitable for automatic focusing operation, thereby blocking the driving of the picture-taking lens by the picture-taking lens driving device, information detecting apparatus for detecting the information of the object, a memory for storing the output of the information detecting apparatus when the object is unsuitable for automatic focusing operation, and a releasing device for comparing the output of the information detecting apparatus with the output of the memory and releasing said blocking by the drive blocking device when the two outputs differ from each other.

11 Claims, 9 Drawing Figures

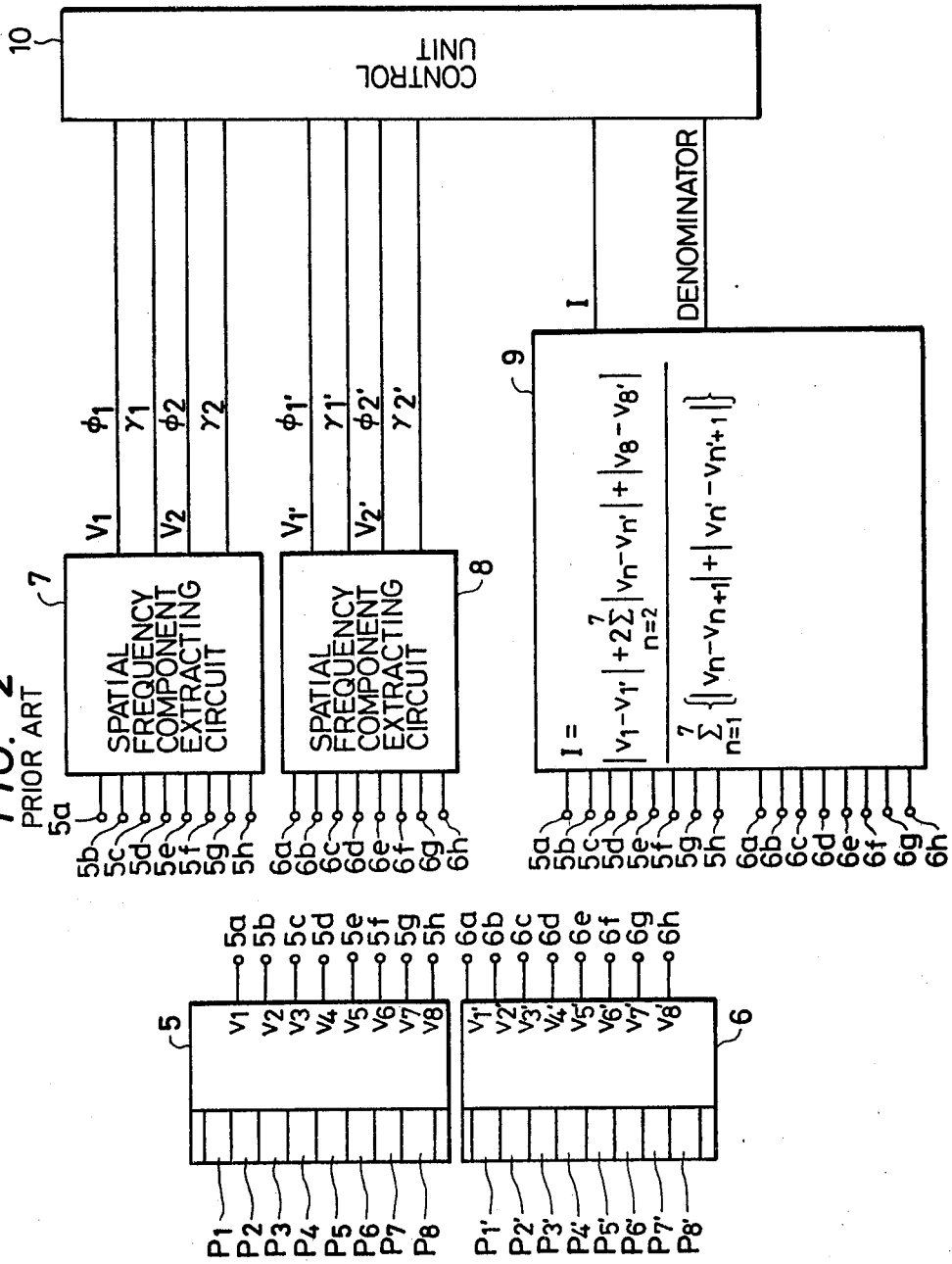

AUTOMATIC FOCUSING DEVICE OF A CAMERA

BACKGROUND OF THE INVENTION

1. Field of the Invention

This invention relates to an automatic focusing device of a camera, and more particularly to an automatic focusing device best suited for an automatic focusing camera in which light passed through a picture-taking lens is metered and the picture-taking lens is driven to the in-focus position on the basis of the metered value.

2. Description of the Prior Art

A variety of so-called TTL type automatic focusing devices in which the focusing operation is effected on the basis of such metered value of the light passed through a picture-taking lens have heretofore been proposed. For example, there is known a system in which light-receiving devices are disposed in front of and behind the predetermined focal plane of the picture-taking lens and a front focus signal (a signal representing that an object image is formed forwardly of the predetermined focal plane), a rear focus signal (a signal representing that an object image is formed rearwardly of the predetermined focal plane) and an in-focus signal (a signal representing that an object image is formed substantially on the predetermined focal plane) are obtained from the difference between the outputs of these light-receiving devices and the picture-taking lens is driven to the in-focus position by these focus detection signals; a system is also known in which a pair of object images formed by light beams passed through two different areas of the picture-taking lens are detected by light-receiving devices, the relative position of the two object images is photoelectrically detected and then front focus, rear focus and in-focus signals are obtained to thereby effect focusing operation. None of these systems can obtain a proper focus detection signal when the object image is of low contrast. There is also a system in which, aside from the contrast of the object image, a proper focus detection signal cannot be obtained if the picture-taking lens is greatly spaced apart from the in-focus position. Low contrast of the object image occurs when the object to be photographed itself is of low contrast like a black board or a white board, for example or when the object itself is of high contrast but the object image is extremely blurred because the picture-taking lens is greatly spaced apart from the in-focus position. In the former case, a focus detection signal cannot originally be obtained and automatic focusing operation is impossible, but in the latter case, the picture-taking lens can be driven between the close distance position (the position of the picture-taking lens when its focus is adjusted to an object at the closest distance) and the infinity position (the position of the picture-taking lens when its focus is adjusted to an object at infinity), namely, over the entire movement range of the picture-taking lens, whereby the picture-taking lens can be brought close to the in-focus position and therefore, a focus detection signal can be obtained and automatic focusing becomes possible. It is disclosed in U.S. Pat. No. 4,303,321 that in case a focus detection signal cannot be obtained because of the low contrast of the object image, the picture-taking lens is forcibly driven over said entire movement range to thereby obtain a focus detection signal.

In case said low contrast is attributable to the low contrast of the object itself, however much the forcible driving of the picture-taking lens may be effected, no focus detection signal can be obtained after all and this means wasteful consumption of the power source. To avoid this, it is desirable to stop the driving of the picture-taking lens when a focus detection signal is not obtained in spite of the picture-taking lens having been driven over at least said entire movement range. However, in case the driving of the picture-taking lens has been so stopped, there arises a problem that even if the object later changes to a high contrast object, focus detecting operation cannot take place immediately thereafter.

Although reference has been made to the TTL type automatic focusing device in the foregoing, the above-noted inconveniences are not limited thereto but generally apply to an automatic focusing device using a focus detecting device which cannot obtain a focus detection signal depending on the object to be photographed.

SUMMARY OF THE INVENTION

It is an object of the present invention to provide a camera capable of automatic focusing which detects that the object to be photographed is unsuitable for focus detection and automatically blocks the driving of the picture-taking lens.

It is another object of the present invention to provide an automatic focusing device of a camera which stops the driving of the picture-taking lens when the object to be photographed does not permit focus detection but automatically releases said stoppage when the object to be photographed has changed.

To achieve these objects, the present invention blocks the driving of the picture-taking lens when the object to be photographed does not permit focus detection and also stores the information regarding the object to be photographed and releases said blocking when the information regarding the object thereafter differs from the stored information.

The invention will become fully apparent from the following detailed description thereof taken in conjunction with the accompanying drawings.

BRIEF DESCRIPTION OF THE DRAWINGS

FIG. 2 is a block diagram pertaining to the known arrangement.

DESCRIPTION OF THE PREFERRED EMBODIMENT

An embodiment of the automatic focusing device of a camera according to the present invention will hereinafter be described with reference to the drawings.

Figure 1:
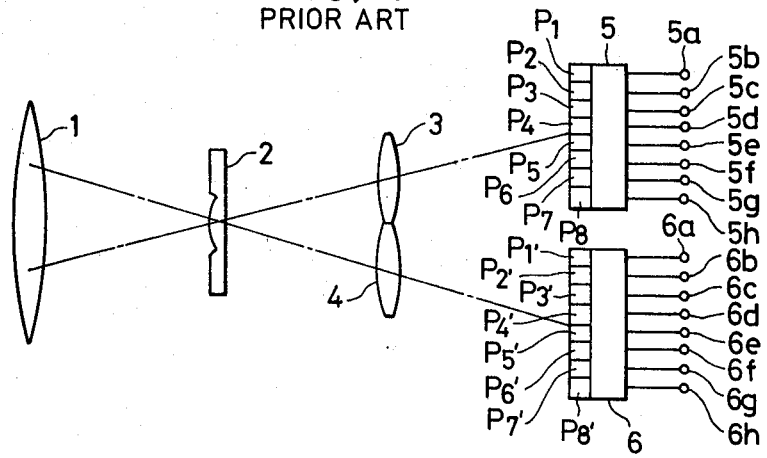
FIG. 1 shows a known optical arrangement.

Referring to FIG. 1, a field lens 2 is provided on the fixed focal plane of a picture-taking lens 1 or on a plane conjugate therewith. Since, in a camera, a film is disposed on the fixed focal plane, the optical path of the picture-taking lens 1 is divided and the field lens 2 is provided in that divided optical path. Photoelectric element arrays 5 and 6 are respectively provided at positions conjugate with the field lens 2, i.e., the fixed focal plane of the lens 1, with respect to re-imaging lenses 3 and 4. In this example, the arrays 5 and 6 comprise eight photoelectric elements P1-P8 and P1'-P8', respectively. The positional relation between the re-imaging lenses 3, 4 and the arrays 5, 6 is determined so that when the picture-taking lens 1 is focused on the intended object, the positional relations between the light images of the object formed on the photoelectric element arrays 5, 6 by the picture-taking lens 1 and the re-imaging lenses 3, 4 and the corresponding arrays 5, 6 are identical. Accordingly, in the case of the in-focus state, the intensities of the lights entering the positionally corresponding photoelectric elements (P1 and P1'), ..., (P8 and P8') of the pair of arrays 5 and 6 become equal. Also, in case the image of the object of the picture-taking lens 1 is formed forwardly of the field lens 2 (in case of the front focus), the image on the array 5 moves downwardly and the image on the array 6 moves upwardly. Conversely, in case the image by the picture-taking lens is formed rearwardly of the field lens 2 (in case of the rear focus), the images on the arrays 5 and 6 move in the directions opposite to the case of the front focus. The photoelectric outputs of the photoelectric elements P1-P8 of the array 5 are linearly amplified or logarithmically amplified and put out from the output terminals 5a-5h of the array 5 as electrical outputs V1-V8 associated with those photoelectric outputs. This also holds true of the photoelectric outputs of the photoelectric elements P1'-P8' of the array 6 and associated electrical outputs V1'-V8' are put out from the output terminals 6a-6h of the array 6.

The processing of these associated electrical outputs V1-V8 and V1'-V8' will now be described. Referring to FIG. 2, a spatial frequency component extracting circuit 7 has input terminals 5a-5h which are connected to the output terminals 5a-5h, respectively, of the array 5, which are given similar reference characters. In the drawings of the present embodiment, if the output terminal of a certain circuit and the input terminal of other circuit are given similar reference characters, it means that those output and input terminals are connected to each other. This extracting circuit 7 extracts from said associated electrical outputs V1-V8 a first electrical signal V1 representing a particular first spatial frequency component of the light image on the array 5 and a second electrical signal V2 representing a spatial frequency component of a half of the spatial period thereof. The second spatial frequency component may be any one having a spatial period different from the first spatial frequency component. The first electrical signal V1 contains phase information $\phi1$ which, when the light image on the array 5 has been displaced in the direction of arrangement of the elements thereof, varies in a predetermined relation in response to the displacement, and magnitude information r1 representing the magnitude of the extracted spatial frequency component. The second electrical signal V2 is also similar and contains phase information $\phi2$ and magnitude information r2. Another spatial frequency component extracting circuit 8 is similar to the circuit 7 and extracts the first and second spatial frequency components of the light image on the array 6 from the associated electrical outputs V1'-V8' of the array 6 and makes first and second electrical signals V1' and V2' representing them, respectively. The first and second electrical signals V1' and V2' contain phase information $\phi1'$, $\phi2'$ and magnitude information r1', r2', respectively.

The principles and specific construction examples of the spatial frequency component extracting circuits 7, 8 are disclosed in detail in U.S. Pat. No. 4,336,450.

Figure 3A:
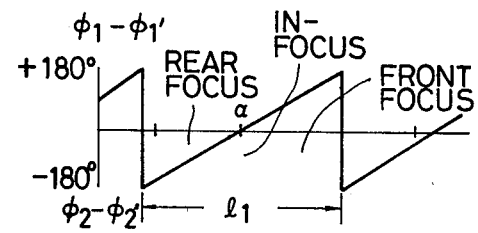
FIG. 3A is a graph showing the relation between the phase difference of the first electrical signal of FIG. 2 and the front focus, the rear focus and the in-focus.

The phase difference $\phi1-\phi1'$ between the first electrical signals V1 and V1' of the spatial frequency component extracting circuits 7 and 8, as is shown in FIG. 3A, becomes zero when the picture-taking lens is in the in-focus position $\alpha$, becomes positive in the front focus position, and becomes negative in the rear focus position, and the magnitude of the difference becomes greater in accordance with the amount of deviation from the in-focus position.

Figure 3B:
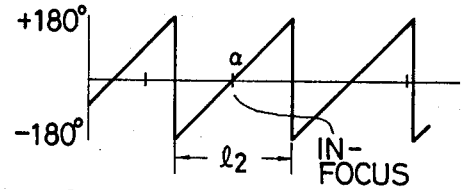
FIG. 3B is a graph similar to FIG. 3A.

The phase difference $\phi2-\phi2'$ between the second electrical signals V2 and V2' is also similar as is shown in FIG. 3B. However, as is apparent from FIGS. 3A and 3B, when the picture-taking lens lies within a predetermined range l1 or l2 including the in-focus position $\alpha$ and the vicinities thereof, said phase differences $\phi1-\phi1'$ and $\phi2-\phi2'$ have sufficient accuracy and accurately represent whether the picture-taking lens is in the front focus state or the rear focus state. However, when the picture-taking lens lies outside said predetermined range, the phase differences erroneously represent the focus adjusted state. There is provided a correlation detecting portion 9 for detecting that the picture-taking lens is near the in-focus position, that is, lies within at least said predetermined range l1 or l2. This correlation detecting portion 9 calculates the correlation function $$I = \left\{ |V1 - V1'| + 2 \sum_{n=2}^{7} |Vn - Vn'| + |V8 - V8'| \right\} \Big/$$

$$\sum_{n=1}^{7} \{|Vn - Vn+1| + |Vn' - Vn'+1|\}.$$

Figure 3C:
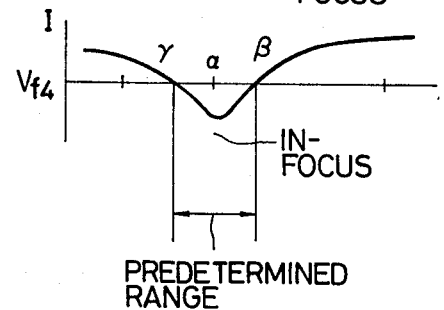
FIG. 3C is a graph showing a correlation function.

The numerator of this correlation function becomes smaller when the brightness distribution of the object is substantially uniform, and the denominator thereof becomes correspondingly smaller and therefore, this correlation function is a normalized one which depends on the focus state of the picture-taking lens, independently of the brightness distribution. More particularly, Vi=Vi' when the picture-taking lens is in the in-focus position and therefore, the numerator becomes zero and I=0, in case of the rear focus or the front focus in which the image on the array 5 is deviated relative to the image on the array 6 by an amount corresponding to a photoelectric element, V2'=V1, V3'=V2, ..., V8'=V7 or V2=V1', V3=V2', ..., V8=V7' are established independently of the brightness distribution of the object, and hence, I=1. In this manner, this correlation function I is normalized at three points, i.e., the in-focus position $\alpha$, the front focus position $\beta$ in which the relative position of the image is deviated by an amount corresponding to a photoelectric element, and the rear focus position $\gamma$ similar to the front focus position, as shown in FIG. 3C. This correlation detecting portion 9, as will later be described in detail, detects whether the picture-taking lens lies within a predetermined range PR near the in-focus shown in FIG. 3C. This predetermined range PR in the vicinity of the in-focus is determined so as to ensure that the phase differences $\phi1-\phi1'$ and $\phi2-\phi2'$ have sufficient accuracy and become positive in case of the front focus and negative in case of the rear focus, and more specifically, so that the predetermined range PR is smaller than the ranges l1 and l2 of FIGS. 3A and 3B. Of course, such a normalized correlation function is not limited to this but various correlation functions are conceivable. For example, it may be $$I' = \sum_{n=1}^{8} |Vn - Vn'|/(r1 + r1' + r2 + r2').$$

Figure 4:
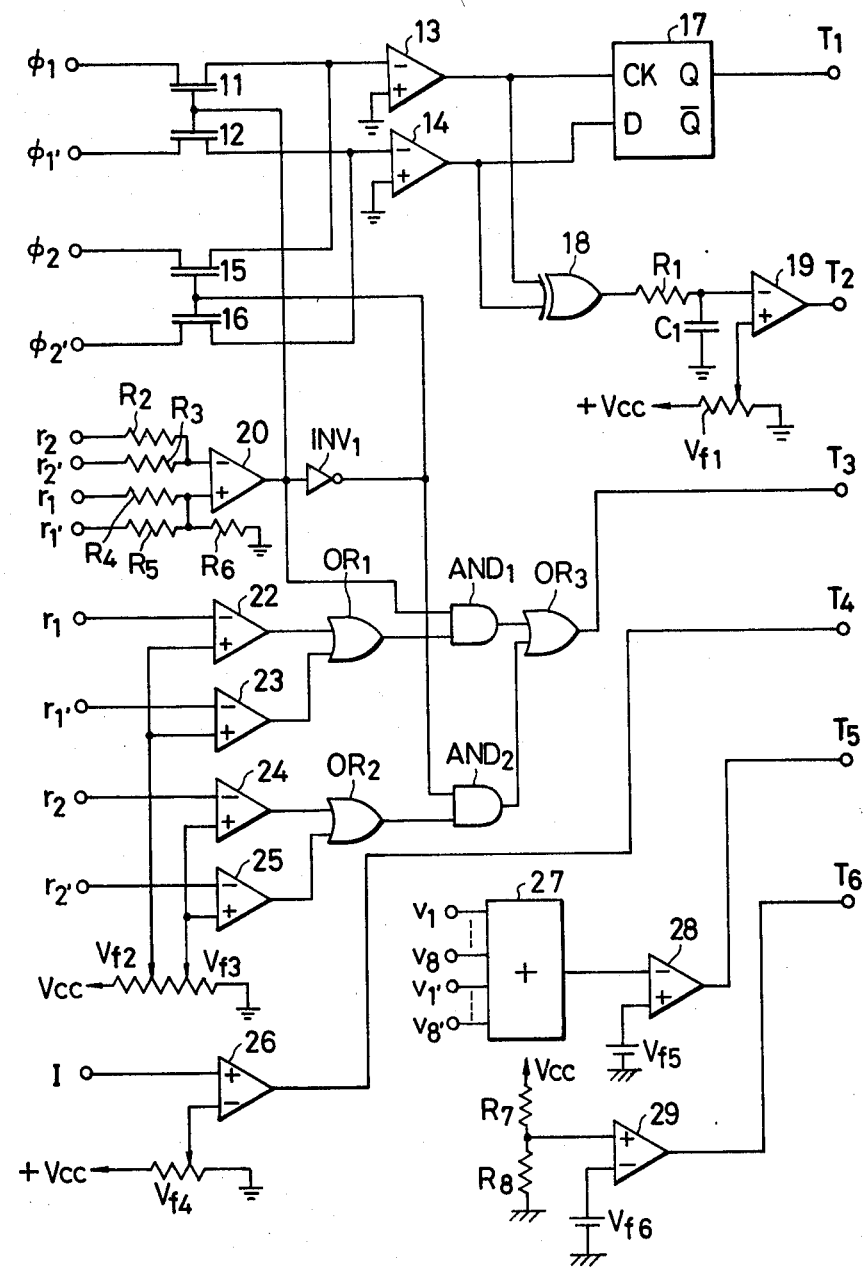
FIG. 4 is a circuit diagram of a device for making a focus detection signal, etc. which is a part of an embodiment of the present invention.

A control unit 10 will now be described. In FIG. 4, AC signals representing the phase information $\phi1$ and $\phi1'$ are respectively input to waveform shaping circuits 13 and 14 through switching FET's (field-effect transistors) 11 and 12. Likewise, AC signals representing the phase information $\phi2$ and $\phi2'$ are respectively input to the waveform shaping circuits 13 and 14 through switching FET's 15 and 16. The pair of FET's 11 and 12 and the pair of FET's 15 and 16 are alternatively turned on and off. The Q output terminal of a front focus and rear focus signal making D-flip-flop 17 (the flip-flop will hereinafter be abbreviated as FF) produces an H-level or an L-level output in accordance with the positive or the negative of the phase difference between the rectangular wave outputs of the shaping circuits 13 and 14. That is, when the FET's 11 and 12 are in their ON state, the Q output of D-FF17 assumes an H-level in case the phase difference $\phi1-\phi1'>0$, namely, in case of the front focus, and assumes an L-level in case the phase difference $\phi1-\phi1'<0$, namely, in case of the rear focus, and when the FET's 15 and 16 are in their ON state, the Q output of D-FF17 assumes an H-level in case $\phi2-\phi2'>0$, namely, in case of the front focus, and assumes an L-level in case $\phi2-\phi2'<0$, namely, in case of the rear focus. An exclusive OR circuit 18 puts out the absolute value of the phase difference between the outputs of the waveform shaping circuits 13 and 14, namely, $|\phi1-\phi1'|$ or $|\phi2-\phi2'|$. A smoothing circuit comprising a resistor R1 and a capacitor C1 smoothes the output of a circuit 18. An in-focus signal making comparator 19 compares the absolute value $|\phi1-\phi1'|$ or $|\phi2-\phi2'|$ of the smoothed phase difference with a reference voltage Vf1 and puts out an H-level signal as the in-focus signal when the former is smaller than the latter. The magnitude of the reference voltage Vf1 is so selected that the comparator 19 produces the in-focus signal when the picture-taking lens has assumed the in-focus state with the depth of focus of the picture-taking lens taken into account. Thus, the elements 5–8, 13, 14 and 17–19 together constitute a focus detecting device for making the front focus, rear focus and in-focus signals. A selecting circuit composed of a comparator 20, the input resistors R2–R6 thereof and an inverter INV1 determines whether a focus detection signal is to be made on the basis of the first spatial frequency component or the second spatial frequency component. All of these input resistors R2–R5 have the same resistance value which is twice the resistance value of a resistor R6. The comparator 20 compares ½ of the sum of the magnitude information r1 and r1' regarding the first spatial frequency component with the sum of the magnitude information r2 and r2' regarding the second spatial frequency component and, when the former is greater, it produces an H-level output and turns on the FET's 11 and 12 and, when the latter is greater, it produces an L-level output and turns on the FET's 15 and 16 through the inverter INV1. The reason why ½ of the sum of the magnitude information r1 and r1' is adopted is that the phase information regarding the second spatial frequency component is better in accuracy than the first spatial frequency component. In this manner, when the first spatial frequency component in the light images on the arrays 5, 6 is sufficiently great as compared with the second spatial frequency component therein, the D-FF 17 and the comparator 19 respectively put out the front focus signal or the rear focus signal and the in-focus signal on the basis of the phase information $\phi1$ and $\phi1'$ and, in the converse case, the D-FF 17 and the comparator 19 respectively put out the front focus signal or the rear focus signal and the in-focus signal on the basis of the phase information $\phi2$ and $\phi2'$.

If the contrast of the object image is low, the magnitudes of the first and second spatial frequency components become small and the phase difference $\phi1-\phi1'$ or $\phi2-\phi2'$ becomes greatly affected by noise and therefore, the accuracy of the front focus, rear focus and in-focus signals is reduced. For this reason, there is provided a contrast detecting circuit for detecting whether the contrast of the object images on the arrays is high or low. This contrast detecting circuit comprises comparators 22–25, reference voltage sources Vf2, Vf3, OR gates OR1, OR2, OR3, and AND gates AND1, AND2. The comparators 22 and 23 respectively compare the magnitudes r1 and r1' of the first spatial frequency components with the reference voltage Vf2 and assume an L-level when the magnitudes r1 and r1' are great enough to sufficiently guarantee the accuracy of the focus detection signal. Likewise, the comparators 24 and 25 assume an L-level when the magnitudes r2 and r2' of the second spatial frequency components are great enough to guarantee said accuracy. When the comparator 20 of the selecting circuit produces an H-level output because the first spatial frequency components are great, the inverter INV1 produces an L-level output. Accordingly, the AND gate AND2 is forced to assume an L-level and, only when the magnitudes r1 and r1' are great to said degree, the OR gate OR3 produces an L-level output. Conversely, when the second spatial frequency components are great, the AND gate AND1 is forced to produce an L-level output and so, the OR gate OR3 produces an L-level output when the magnitudes r2 and r2' are great to said degree. A comparator 26 compares the correlation signal I with a reference voltage Vf4 and puts out an L-level output when the former is smaller than the latter, and puts out an H-level output in the converse case. The L-level output indicates a fact that the picture taking lens lies within the predetermined range PR in FIG. 3C, and is named herein the within-predetermined-range signal. The H-level output indicates a fact that the picture taking lens lies outside the predetermined range PR and is named herein the outside-predetermined range signal.

An adding circuit 27 adds all the electrical outputs V1–V8 and V1'–V8' of the first and second arrays 5 and 6. Accordingly, the output of this circuit 27 represents the brightness of the object images on the two arrays. If the brightness of the object is remarkably low, the noise in the photoelectric output increases to prevent proper focus detection from being accomplished. A comparator 28 compares the output of the adding circuit 27 with a reference voltage Vf5 and puts out an L-level output when the brightness of the object is so low that focus detection cannot be accomplished.

Voltage dividing resistors R7 and R8 divide the voltage Vcc of the driving power source of this automatic focusing device. A source voltage detecting comparator 29 compares this divided voltage with a reference voltage Vf6 and puts out an H-level signal when the source voltage Vcc is higher than a value which can guarantee the normal operation of the automatic focusing device, and puts out an L-level signal when the source voltage Vcc is lower than said value.

Summing up the foregoing description, an H-level signal is put out to a terminal T1 in case of the front focus and an L-level signal is put out to said terminal T1 in case of the rear focus; an H-level signal is put out to a terminal T2 in case of the in-focus and an L-level signal is put out to said terminal T2 in case of the out-of-focus; an L-level signal is put out to a terminal T3 when the object image is of high contrast and an H-level signal is put out to said terminal T3 when the object image is of low contrast; an L-level signal is put out to a terminal T4 when the picture-taking lens is within the predetermined range PR in the vicinity of the in-focus position and an H-level signal is put out to said terminal T4 when the picture-taking lens is outside said predetermined range PR; and an L-level signal is put out to a terminal T5 when the brightness of the object is sufficiently high for focus detection and an H-level signal is put out to said terminal T5 when the brightness of the object is low. Also, an H-level signal is put out to a terminal T6 when the source voltage is sufficient for the normal operation of this automatic focusing device and an L-level signal is put out to said terminal T6 when the source voltage is insufficient.

Figure 5:
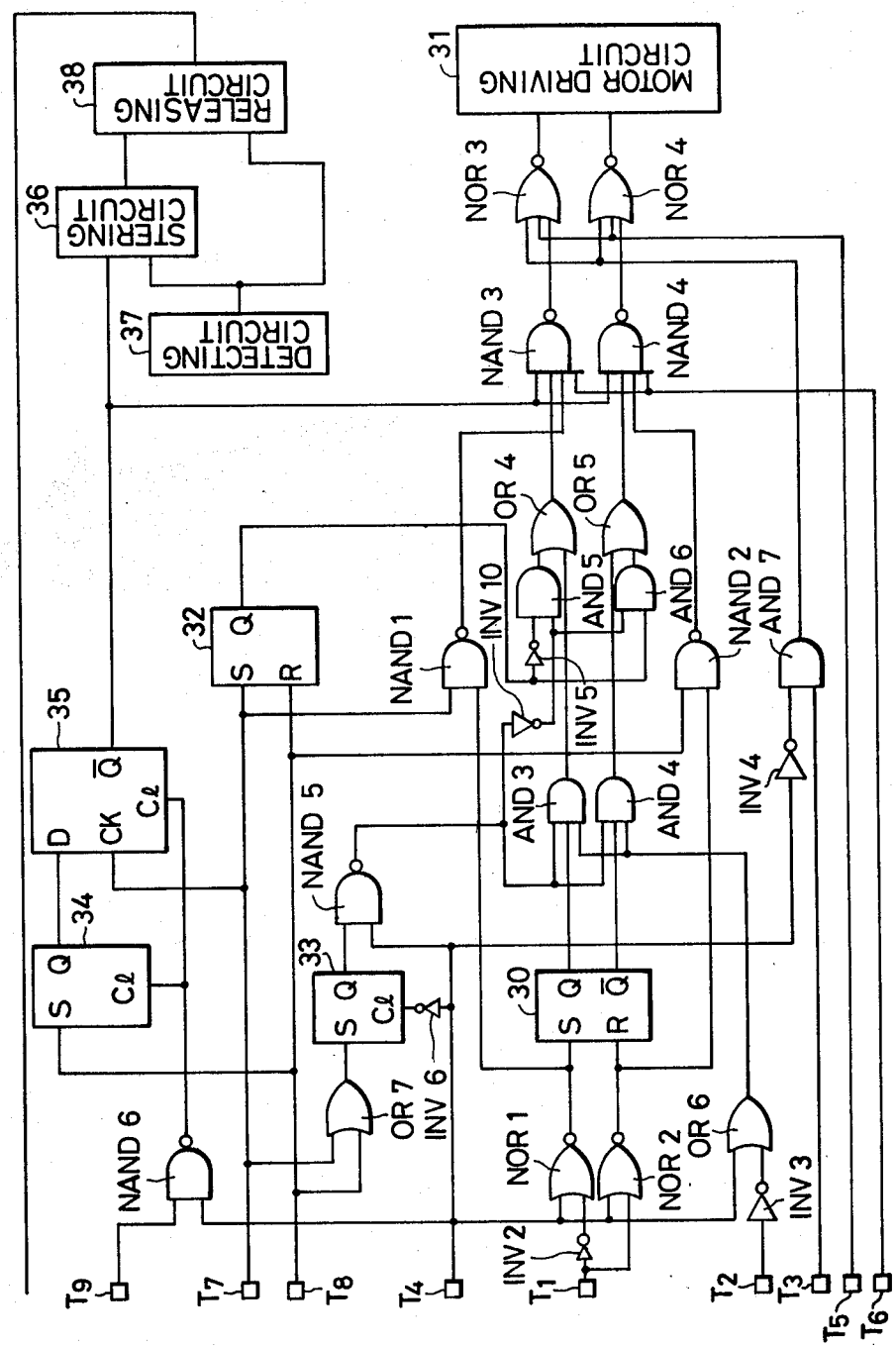
FIG. 5 is a circuit diagram of a picture-taking lens driving system which is a part of the embodiment.
Figure 6:
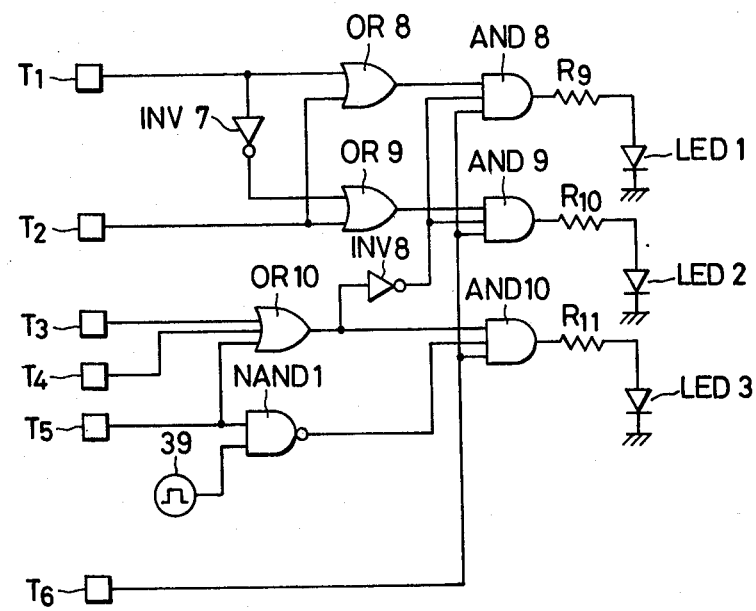
FIG. 6 is a circuit diagram of a display system.

Reference is now had to FIGS. 5 and 6 to describe a picture-taking lens driving system for driving the picture-taking lens on the basis of each output of FIG. 4 and a display system for displaying the focus detection condition.

Referring to FIG. 5, input terminals T1-T6 are respectively connected to the output terminals T1-T6 of FIG. 4 which are given similar reference characters. An H-level signal is input to an input terminal T7 when the picture-taking lens has arrived at the infinity position and an L-level signal is input to said terminal T7 when the picture-taking lens is in a position other than the infinity position, and an H-level signal is input to an input terminal T8 when the picture-taking lens has arrived at the close distance position and an L-level signal is input to said terminal T8 when the picture-taking lens is in a position other than the close distance position. The signals input to these terminals T7 and T8 can be prepared as by providing a pair of switches respectively operable when the picture-taking lens has arrived at the infinity position and when the picture-taking lens has arrived at the close distance position. A release signal for releasing the blocking of the picture-taking lens drive which will hereinafter be described is input to an input terminal T9.

The terminal T1 is connected to a NOR gate NOR1 through an inverter INV2 and also is directly connected to a NOR gate NOR2. The other input terminals of the NOR gates NOR1 and NOR2 are both connected to the terminal T4. The output terminal of the NOR gate NOR1 is connected to the set input terminal of a flip-flop 30 and to one input terminal of a NAND gate NAND1, and the output terminal of the NOR gate NOR2 is connected to the reset input terminal of the flip-flop 30 and to one input terminal of a NAND gate NAND2. The other input terminals of the NAND gates NAND1 and NAND2 are connected to terminals T7 and T8, respectively. The flip-flop 30, when the signal changes from the within-predetermined-range signal to the outside-predetermined-range signal, stores the front focus signal or the rear focus signal input to the terminal T1 immediately before said change, during the production of said outside-predetermined-range signal. The Q output of this flip-flop 30 is supplied to a NOR gate NOR3 through an AND gate AND3, an OR gate OR4 and a NAND gate NAND3 in succession, and the $\overline{Q}$ output of the flip-flop 30 is supplied to a NOR gate NOR4 through an AND gate AND4, an OR gate OR5 and a NAND gate NAND4. A motor driving circuit 31 including a motor is controlled by the outputs of the NOR gates NOR3 and NOR4, and it front-focus-drives the picture-taking lens, namely, drives the picture-taking lens toward the infinity position, when the NOR gate NOR3 is producing an H-level signal, rear-focus-drives the picture-taking lens, namely, drives the picture-taking lens toward the close distance position, when the NOR gate NOR4 is producing an H-level signal, and stops driving when these NOR gates are producing an L-level signal. The specific construction of this motor driving circuit 31 is disclosed U.S. patent application Ser. No. 388,152. The other two input terminals of each of the AND gates AND3 and AND4 are respectively connected to the output terminal of a NAND gate NAND5 and the output terminal of an OR gate OR6. The two input terminals of the OR gate OR6 are respectively connected to the input terminal T4 and to the terminal T2 through an inverter INV3. An inverter INV10 has its input terminal connected to the output terminal of a NAND gate NAND5 and its output terminal connected to AND gates AND5 and AND6. The output terminals of the AND gates AND5 and AND6 are connected to OR gates OR4 and OR5, respectively. An AND gate AND7 has its two input terminals respectively connected to the terminal T3 and to the terminal T4 through an inverter INV4, and its output terminal connected to NOR gates NOR3 and NOR4. The terminal T5 is connected to the NOR gates NOR3 and NOR4 and the terminal T6 is connected to the NAND gates NAND3 and NAND4. Terminals T7 and T8 are respectively connected to the set input terminal and the reset input terminal of a flip-flop 32, and the Q output terminal of this flip-flop 32 is connected to the AND gate 5 through an inverter INV5 and directly to the AND gate AND6. The terminals T7 and T8 are also connected to the set input terminal of a flip-flop 33 through an OR gate OR7. The Q output terminal of the flip-flop 33 is connected to the input terminal of the NAND gate NAND5, and the clear terminal Cl of the flip-flop 33 is connected to the terminal T4 through an inverter INV6. Terminals T4 and T9 are connected to the input terminals of the NAND gate NAND6, the output terminal of which is connected to the clear terminal Cl of each of flip-flops 34 and 35. The set input terminal of the flip-flop 34 is connected to the terminal T8 and the Q output terminal of the flip-flop 34 is connected to the D input terminal of the flip-flop 35. The clock input terminal of the flip-flop 35 is connected to the terminal T7 and the $\overline{Q}$ output terminal of the flip-flop 35 is connected to the input terminals of the NAND gates NAND3 and NAND4 and to an object information storing circuit 36. An object information detecting circuit 37 serves to detect information such as the brightness, contrast, etc. of the object whose focus is to be detected. The storing circuit 36 stores the output of the detecting circuit 37 therein when the $\overline{Q}$ output of the flip-flop 35 has assumed L-level. A releasing circuit 38 compares the stored value in the storing circuit 36 with the detection output of the detecing circuit 37 and delivers an L-level output to a terminal T9 when the difference between the two exceeds a predetermined value.

In the foregoing, the NOR gates NOR1 and NOR2, the flip-flop 30, the motor driving circuit 31, etc. together constitute a picture-taking lens driving device, and the NAND gates NAND3 and NAND4, and the flip-flops 34 and 35 together constitute a drive blocking device.

The construction of a display device will now be described by reference to FIG. 6 wherein the input terminals T1–T6 are connected to the output terminals T1–T6, respectively, of FIG. 4. The two input terminals of an OR gate OR8 are connected to the terminals T1 and T2, respectively, and the input terminals of an OR gate OR9 are respectively connected to the terminal T1 through an inverter INV7 and directly to the terminal T2. The input terminals of an OR gate OR10 are connected to the terminals T3, T4 and T5, respectively, and the input terminals of a NAND gate NAND7 are connected to the terminal T5 and a clock pulse generator 39, respectively. An AND gate AND8 has its input terminals respectively connected to the OR gate OR8, to the OR gate OR10 through an inverter INV8 and to the terminal T6 and has its output terminal connected to a light-emitting diode LED1 through a resistor R9. An AND gate AND9 has its input terminals connected to the OR gate OR9, the inverter INV8 and the terminal T6, respectively, and has its output terminal connected to a light-emitting diode LED2 through a resistor R10. An AND gate AND10 has its input terminals connected to the OR gate OR10, the NAND gate NAND7 and the terminal T6, respectively, and has its output terminal connected to a light-emitting diode LED3 through a resistor R11.

The operations of the circuits of FIGS. 5 and 6 will now be described.

(I) A case the object image is of high contrast and both the brightness of the object and the source voltage are sufficiently high:

In this case, an L-level signal representing the high contrast is input to the terminal T3, an L-level signal representing the high brightness is input to the terminal T5, and an H-level signal representing high source voltage is input to the terminal T6.

(I.1) When the picture-taking lens lies within the predetermined range PR in the vicinity of the in-focus:

At this time, an L-level signal which is the within-predetermined-range signal is input to the terminal T4. By this signal, both of the NAND gates NAND5 and NAND6 produce an H-level output. The flip-flops 34 and 35 are cleared by the H-level output of the latter NAND gate.

(I.1.a) In case of the front focus:

In case of the front focus, an H-level signal is input to the terminal T1. By this H-level signal and the L-level signal of the terminal T4, the NOR gate NOR1 produces an H-level output and the NOR gate NOR2 produces an L-level output, and the Q output of the flip-flop 30 assumes H-level and the $\overline{Q}$ output of the same flip-flop assumes L-level. Since the picture-taking lens is in the out-of-focus state, an L-level signal is input to the terminal T2 and, since the NAND gate NAND5 is producing an H-level signal as described above, the AND gate AND3 opens its gate. The Q output of the flip-flop 30 is input to the NAND gate NAND3 through the AND gate AND3 and the OR gate OR4. Assuming that the picture-taking lens lies between the infinity position and the close distance position, the terminal T7 is producing an L-level signal and therefore, the NAND gate NAND1 produces an H-level output. The $\overline{Q}$ output of the flip-flop 35 is an H-level output and the terminal T6 is producing an H-level signal. Therefore the NAND gate NAND3 produces an L-level output by the H-level output of the OR gate OR4. By the L-level signal of the terminal T3, the AND gate AND7 also produces an L-level output and the terminal T5 is also producing an L-level signal and therefore, the NOR gate NOR3 produces an H-level output by the L-level output of the abovedescribed NAND gate NAND3. By this H-level output, the motor drivng circuit 31 rotates the motor in the forward direction and drives the picture-taking lens toward the infinity position, thereby bringing the lens close to the in-focus position.

The display condition at this time will now be described.

In FIG. 6, the OR gates OR8, OR9 and OR10 produce an H-level output, an L-level output and an L-level output, respectively, and the NAND gate NAND7 produces an H-level output. Thereby, the AND gate AND8 produces an H-level output and turns on the light-emitting diode LED1. Both of the other AND gates AND9 and AND10 are producing an L-level output and therefore, the other light-emitting diodes LED2 and LED3 are turned off. In this manner, the front focus state is displayed by the turn-on of only the light-emitting diode LED1.

(I.1.b) In case of the rear focus:

An L-level signal which is the rear focus signal is input to the terminal T1 and, as described above, an L-level signal which is the within-predetermined-range signal is input to the terminal T4 and therefore, the NOR gates NOR1 and NOR2 produce an L-level output and an H-level output, respectively, and the $\overline{Q}$ output of the flip-flop 30 assumes H-level. This H-level output passes through the AND gate AND4, the OR gate OR5 and the NAND gate NAND4 to render the NOR gate NOR4 into an H-level output. Thereby, the motor driving circuit 31 rotates the motor in the reverse direction and drives the picture-taking lens toward the close distance position, thereby bringing the lens close to the in-focus position.

The display mode of this rear focus is such that the light-emitting diodes LED1 and LED3 are turned off and the LED2 is turned on because, in FIG. 6, the terminal T1 is inverted to L-level as compared with the case of the front focus.

(I.1.c) In case of the in-focus:

In FIG. 5, when the picture-taking lens arrives at the in-focus position, an H-level signal is input to the terminal T2 and this closes the gates of both of the AND gates AND3 and AND4 through the inverter INV3 and the OR gate OR6. Thereby, both of the NOR gates NOR3 and NOR4 produce an L-level output and the motor driving circuit 31 stops driving the picture-taking lens, thus causing the lens to rest at the in-focus position.

The display mode during this in-focus will now be described. In FIG. 6, the H-level signal of the terminal T2 turns on the light-emitting diodes LED1 and LED2 through the OR gates OR8, OR9 and the AND gates AND8, AND9. The light-emitting diode LED3 is in its turned off state. The in-focus is displayed by the turn-on of the light-emitting diodes LED1 and LED2.

Even if the picture-taking lens is driven toward the close distance position in accordance with the rear focus signal and finally reaches the close distance position, the rear focus signal is still input to the terminal T1 if the focus detecting device is out of order or if the object is nearer to the camera than to the shortest position in which the in-focus of the picture-taking lens is possible. This rear focus signal is not desirable because, in spite of the picture-taking lens having already arrived at the close distance position which is one end of its movement range, it tends to drive the picture-taking lens further in the same direction. Therefore, when the picture-taking lens arrives at the close distance position, an H-level signal is input to the terminal T8 and, by this H-level signal and the H-level signal of the NOR gate NOR2, the NAND gate NAND2 produces an L-level output which inverts the NAND gate NAND4 to an H-level output, and forces the NOR gate NOR4 to produce an L-level output in spite of the rear focus signal being produced, thus stopping driving the picture-taking lens. Likewise, in case the front focus signal is still produced even if the picture-taking lens has arrived at the infinity position, an H-level signal is input to the terminal T7 by the arrival at the infinity position and, by this H-level signal and the H-level signal of the NOR gate NOR1, the NAND gate NAND1 produces an L-level output. By this L-level output, the NAND gate NAND3 is forced to produce an H-level output, thus stopping driving the picture-taking lens.

Such an abnormal situation can be recognized by only one of the light-emitting diodes LED1 and LED2 of FIG. 6 remaining turned on in spite of the picture-taking lens having been stopped.

(I.2) In case of being outside the predetermined range PR in the vicinity of the in-focus:

At this time, an H-level signal which is the outside-predetermined-range signal is input to the terminal T4. This H-level signal renders the OR gate OR6 into H-level independently of the in-focus signal of the terminal T2 and also renders the AND gate AND7 into an L-level output through the inverter INV4 independently of the contrast signal of the terminal T5. Thus, in case of being outside the predetermined range PR in the vicinity of the in-focus, neither of the in-focus signal and the contrast signal are concerned in the picture-taking lens driving. The above-mentioned H-level signal of the terminal T4 further renders both of the NOR gates NOR1 and NOR2 into L-level output. Thereby, the output of the flip-flop 30 is held in the state immediately before the outside-predetermined-range condition is reached. Accordingly, when this outside-predetermined-range condition is reached, the picture-taking lens is forcibly driven in a direction determined by the input signal to the terminal T1 immediately before the outside-predetermined-range condition is reached, independently of the front focus signal or the rear focus signal to the terminal T1 thereafter. When the picturetaking lens enters the predetermined range PR in the vicinity of the in-focus by this forcible driving, an L-level signal is input to the terminal T4 and the operations previously described under items (I.1.a)–(I.1.c) above are carried out. However, in case the picture-taking lens does not enter the predetermined range PR by said forcible driving but arrives at the infinity position or the close distance position, the following operation is carried out.

Assume that when the outside-predetermined-range condition has been reached, the $\bar{Q}$ output of the flip-flop 30 is at H-level. At this time, the picture-taking lens is rear-focus-driven and forcibly driven toward the close distance position. When the picture-taking lens arrives at the close distance position under the outside-predetermined-range condition, an H-level signal is input to the terminal T8 and this H-level signal sets both of the flip-flops 33 and 34 and resets the flip-flop 32. By the setting of this flip-flop 34, an H-level signal is input to the D input terminal of the flip-flop 35. In this manner, the fact that the picture-taking lens has arrived at the close distance position is stored in the flip-flops 34 and 35. Also, by the setting of said flip-flop 33, the NAND gate NAND5 produces an L-level output to render both of the AND gates AND3 and AND4 into L-level output, thus stopping the rear focus driving of the picture-taking lens. By the L-level output of the NAND gate NAND5, the inverter INV10 produces an H-level output and by the resetting of said flip-flop 32, the inverter INV5 produces an H-level output and therefore, the AND gate AND5 produces an H-level output. This H-level output renders the NOR gate NOR3 into H-level output through the OR gate OR4 and the NAND gate NAND3, reverses the driving of the picture-taking lens and front-focus-drives the picture-taking lens and forcibly drives it toward the infinity position. As soon as the in-focus vicinity within-predetermined-range signal is produced by this forcible driving to the infinity position, the operations described under items (I.1.a)–(I.1.b) above are carried out. However, if the object to which the picture-taking lens is to be focused has a depth or the object itself is of low contrast, the within-predetermined-range signal is not obtained even by such forcible driving and after all, the picture-taking lens arrives at the infinity position. Thereupon, an H-level signal is input to the terminal T7 and this signal sets the flip-flop 32 and also causes the flip-flop 35 to read the Q output of the flip-flop 34. By this reading, the $\bar{Q}$ output of the flip-flop 35 assumes L-level and causes the storing circuit 36 to store the output of the detecting circuit 37 regarding the then object information and also renders the NAND gates NAND3 and NAND4 into H-level output, thus stopping the picture-taking lens driving. Thus, in case the outside-predetermined-range signal is produced, namely, in case it is not guaranteed that a proper focus detection signal is produced, the picture-taking lens is forcibly driven independently of the then focus detection signal to discriminate whether the cause is due to the low contrast of the object image resulting from the picture-taking lens being greatly spaced apart from the in-focus position or due to the nature of the object itself. When the within-predetermined-range signal is not obtained after all even if this forcible driving is effected over the entire movement range between the close distance position and the infinity position, it is judged that said cause is due to the nature of the object itself, and the picture-taking lens driving is blocked at the infinity position and the then object information is stored.

Thereafter, if the object to which the picture-taking lens is to be focused changes as by the operation of turning the camera to another object, the releasing circuit 38 finds the amount of the difference between the detection output of the detecting circuit 37 representing the information of the object after said change and the stored output in the storing circuit 36 and, when the amount is greater than a predetermined value, an L- level output is delivered to the terminal T9. In response to this L-level output, the NAND gate NAND6 clears the flip-flops 34 and 35, thus releasing the aforementioned blocking of the picture-taking lens driving. Upon this release, the operation described under item (I.1) above is carried out if the lens is within the predetermined range PR in the vicinity of the in-focus, and the operation described under item (I.2) above is carried out if the lens is outside said predetermined range.

In the present embodiment, the clearing of the flip-flops 34 and 35, namely, the releasing of the blocking of the picture-taking lens driving, is carried out not only by the output of the releasing circuit 38 but also by the within-predetermined-range signal. The reason is that when a change occurs from outside said predetermined range PR to within said predetermined range, the output of the detecting circuit 37 also changes generally and the releasing circuit 38 produces an L-level output, but depending on the selection of the object information to be detected by the detecting circuit 37, such as, for example, the brightness or the contrast of the object, the releasing circuit 38 may sometimes not produce the release signal even if the within-predetermined-range condition is reached.

In the foregoing, description has been made of an example in which, outside the predetermined range PR, the picture-taking lens is first rear-focus-driven and then front-focus-driven and stopped at the infinity position, but in case the Q output of the flip-flop 30 assumes H-level and the picture-taking lens is front-focus-driven when the outside-predetermined-range condition has been reached, the picture-taking lens at first arrives at the infinity position, and then is rear-focus-driven and arrives at the close distance position, whereafter the lens is front-focus-driven and stopped at the infinity position. In the present embodiment, the final stop position of the picture-taking lens is always in the infinity position, but of course, it may be the close distance position or other arbitrary position.

Description will now be made of the display mode in case of being outside the predetermined range PR in the vicinity of the in-focus. In FIG. 6, the H-level signal input to the terminal T4 is inverted by the inverter INV8 and input to the AND gates AND8 and AND9 and therefore, the light-emitting diodes LED1 and LED2 are both turned off. On the other hand, since the brightness of the object is high, an L-level signal is input to the terminal T5 and therefore, the NAND gate NAND7 produces an H-level output. Since the source voltage also is high, an H-level signal is input to the terminal T6 and after all, all of the inputs of the AND gate AND10 assume L-level and therefore, the light-emitting diode LED3 is turned on.

(II) The case of low contrast:

If the object image is of low contrast, an H-level signal is input to the terminal T3. If, at this time, the picture-taking lens is outside the predetermined range PR the AND gate AND7 produces an L-level output and opens the gates of the NOR gates NOR3 and NOR4 and therefore, the picture-taking lens is forcibly driven as described under item (I.2) above, in accordance with the outputs of the NAND gates NAND3 and NAND4.

On the other hand, if the picture-taking lens is within the predetermined range PR, the AND gate AND7 produces an H-level output and renders both of the NOR gates NOR3 and NOR4 into L-level output, thus stopping the picture-taking lens. In case of low contrast even if the picture-taking lens is thus within the predetermined range PR, the low contrast is considered to be attributable to the low contrast of the object itself and therefore, proper focus detection is impossible and consequently, the picture-taking lens driving is stopped.

The display mode in the case of such low contrast is such that an H-level signal is input to the terminal T3 and just the same condition as in the case of being outside the predetermined range PR is brought about, and the light-emitting diodes LED1 and LED2 are turned off while the light-emitting diode LED3 is turned on.

(III) The case of low brightness:

In this case, the outputs of the photoelectric elements become very small and proper focus detection cannot be accomplished. Therefore, the H-level signal input to the terminal T5 renders both of the NOR gates NOR3 and NOR4 into L-level output and stops the picture-taking lens driving.

The display mode will now be described. In FIG. 6, the H-level signal input to the terminal T5 is inverted by the inverter INV8 and turns off the light-emitting diodes LED1 and LED2. Also, by the above-mentioned H-level signal, the output of the NAND gate NAND7 becomes the inverted output of the clock pulse generator 39 and turns on and off the light-emitting diode LED3 alternately.

(IV) The case of reduction in source voltage:

When the source voltage is reduced, an L-level signal is input to the terminal T6 and this renders both of the NAND gates NAND3 and NAND4 into H-level output, thus stopping the picture-taking lens. The then display mode is such that the L-level signal of the terminal T6 is input to the AND gates AND8–AND10 and therefore, all of the light-emitting diodes LED1–LED3 are turned off.

Figure 7:
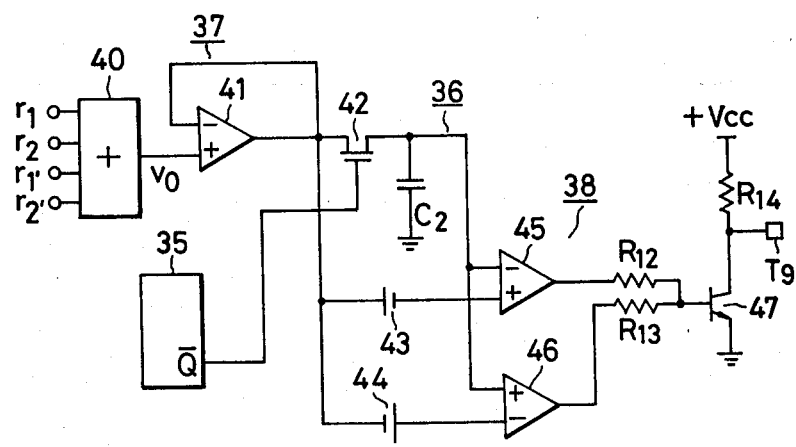
FIG. 7 is a specific circuit diagram of a portion of FIG. 6.

FIG. 7 shows specific examples of the construction of the storing circuit 36, the object information detecting circuit 37 and the releasing circuit 38 of FIG. 5.

In FIG. 7, the detecting circuit 37 comprises an adding circuit 40 for adding the magnitude information r1, r1', r2 and r2' of the first and second spatial frequency components and putting out an addition output V0, and a voltage follower 41. The magnitudes of said spatial frequency components represent the contrast of the object image and thus, the detecting circuit 37 detects the contrast as the object information. The storing circuit 36 comprises a switching FED42 adapted to be turned on and turned off, respectively, when the $\overline{Q}$ output of the flip-flop 35 is at H-level and at L-level, and a storage capacitor C2 connected to the voltage follower 41 through the FET 42. The releasing circuit 38 comprises reference voltage sources 43, 44, a comparator 45 for comparing the output of the voltage source 43 with the output of the capacitor C2, a comparator 46 for comparing the output of the voltage source 44 with the output of the capacitor C2, output resistors R12, R13, a transistor 47 ON-OFF-controlled by the outputs of the comparators 45, 46, and an output resistor R14 thereof. The terminal T9 is connected to the collector of the transistor 47.

With such a construction, the FET 42 is in its ON state when the $\overline{Q}$ output of the flip-flop 35 is at H-level and therefore, the addition output V0 is applied to the inverting input terminal of the comparator 45 through the voltage follower 41, and the addition output V0 minus the voltage of the reference voltage source 43 is applied to the non-inverting input terminal of the comparator 45. Also, the addition output V0 plus the voltage of the reference voltage source 44 is applied to the inverting input terminal of the comparator 46, and the addition voltage V0 is applied to the non-inverting input terminal of the comparator 46. Accordingly, when the FET 42 is in its ON state, both of the two comparators 45 and 46 produce an L-level output independently of the object information, i.e., the addition output V0, and turn off the transistor 47 and deliver an H-level signal to the terminal T9.

When the $\overline{Q}$ output of the flip-flop 35 becomes an L-level output, the FET 42 is turned off and the capacitor C2 stores the then addition output V0 as the charging voltage. Thereafter, when the object changes and the addition output V0 changes and this becomes greater than the stored voltage by a predetermined value or more, specifically, by the voltage of the reference voltage source 43 or more, the comparator 45 produces an H-level output. Likewise, when the changed addition output V0 has become smaller than the stored voltage by a predetermined value or more, specifically, by the voltage of the reference voltage source 44 or more, the comparator 46 produces an H-level output. By the H-level output of one of the comparators 45 and 46, the transistor 47 is turned on, the terminal T9 assumes L-level and the blocking of the motor drive is released.

In this manner, in the example shown in FIG. 7, said release is effected when the object information has increased or decreased relative to the stored value by a predetermined value or more. However, this release may also be effected by only one of the increase and decrease by said predetermined value or more. In the foregoing example, the information associated with the contrast has been chosen as the object information, but any information may be chosen which is liable to change correspondingly to a change in the object.

Also, in the present embodiment, the front focus, rear focus and in-focus signals are prepared on the basis of the particular spatial frequency components of the object image, whereas the present invention is not restricted thereto but any means may be used.

As will be apparent from the foregoing description, according to the present invention, when the object does not permit focus detection, the driving of the picture-taking lens is stopped while, at the same time, the then object information is stored and when the object changes later, the stoppage of said driving is released on the basis of the stored information and the object information after said change. Accordingly, wasteful consumption of the power source can be prevented by said stoppage of the driving, and when the object changes, the focusing operation can be automatically entered to accomplish quick automatic focusing by the release of said stoppage of the driving.

We claim:

1. A camera capable of automatic focusing operation, comprising:
   (1) a picture-taking lens;
   (2) photoelectric detector means for photoelectrically detecting the light from an object to be photographed;
   (3) picture-taking lens driving means for driving said picture-taking lens to the in-focus position on the basis of the output of said photoelectric detector means;
   (4) a drive blocking device for detecting that the object is unsuitable for automatic focusing operation, thereby blocking the driving of said picture-taking lens by said picture-taking lens driving means;
   (5) information detecting means for detecting the information of the object;
   (6) memory means for storing the output of said information detecting means when the object is unsuitable for automatic focusing operation; and
   (7) releasing means for comparing the output of said information detecting means with the output of said memory means and releasing said blocking by said drive blocking means when said two outputs differ from each other.

2. A camera capable of automatic focusing operation, including:
   (1) a picture-taking lens movable over a predetermined movement range;
   (2) focus detecting means for detecting whether the object image by said picture-taking lens is in focus;
   (3) drive means for driving said picture-taking lens to the in-focus position in response to the output of said focus detecting means;
   (4) blocking means for detecting that the object does not permit focus detection and blocking the driving of said picture-taking lens by said drive means;
   (5) information detecting means for detecting the information of the object;
   (6) memory means for storing the output of said information detecting means when the object does not permit focus detection; and
   (7) releasing means for comparing the output of said information detecting means with the output of said memory means and releasing the blocking by said drive blocking means when said two outputs differ from each other.

3. A camera according to claim 2, wherein said memory means effects said storage in response to said blocking operation of said blocking means.

4. A camera according to claim 3, wherein said information detecting means detects information regarding the contrast of the object image.

5. A camera according to claim 2, wherein said releasing means releases said blocking when the output of said information detecting means differs from the output of said memory means by a predetermined value or more.

6. A camera according to claim 2, further including range detecting means for detecting whether said picture-taking lens is within a predetermined range including the in-focus position and producing a first signal when said picture-taking lens is within said predetermined range and producing a second signal when said picture-taking lens is outside said predetermined range, and wherein said focus detecting means photoelectrically detects the object image formed by said picture-taking lens, said drive means, when it receives said first signal, drives said picture-taking lens to the in-focus position in accordance with the output of said focus detecting means and, when it receives said second signal, drives said picture-taking lens to bring it into said predetermined range, said drive blocking means blocks the driving of said picture-taking lens when the object does not permit focus detection even if said picture-taking lens is driven over at least its entire movement range in response to said second signal, and said memory means effects said storage in response to said blocking operation of said blocking means.

7. A camera according to claim 6, wherein said releasing means further releases said blocking in response to said first signal of said range detecting means.

8. A camera according to claim 6, further including contrast detecting means for detecting the contrast of the object image formed by said picture-taking lens and producing a low contrast output when said contrast is below a predetermined value and wherein said blocking means further blocks the driving of said picture-taking lens in response to said second signal of said range detecting means and said low contrast output.

9. A camera capable of automatic focusing operation, including:
 (1) a picture-taking lens movable over a predetermined movement range;
 (2) means for detecting an object image formed by said picture-taking lens and producing a focus detection signal for driving said picture-taking lens to the in-focus position, said focus detection signal sometimes having sufficient accuracy and sometimes having insufficient accuracy in accordance with the condition of the object image;
 (3) means for detecting said object image and producing a first signal which guarantees that said focus detection signal has sufficient accuracy and a second signal which does not guarantee that said focus detection signal has sufficient accuracy;
 (4) drive means responsive to said focus detection signal, said first signal and said second signal to drive said picture-taking lens, said drive means, when said first signal is produced, driving said picture-taking lens to the in-focus position in response to said focus detection signal and driving said picture-taking lens over said entire movement range in response to said second signal;
 (5) blocking means for blocking the driving of said picture-taking lens when said first signal is not produced even if said picture-taking lens is driven over at least said entire movement range in response to said second signal;
 (6) information detecting means for detecting the information of the object;
 (7) memory means for storing the output of said information detecting means in response to said blocking by said blocking means; and
 (8) releasing means for releasing said blocking when the output of said information detecting means and the output of said memory means differ from each other.

10. A camera capable of automatic focusing, including:
 (1) a picture-taking lens movable over a predetermined movement range;
 (2) focus detecting means for detecting the light from an object passed through said picture-taking lens and detecting whether the object image by said picture-taking lens is in focus;
 (3) range detecting means for detecting whether said picture-taking lens is within a predetermined range including the in-focus position and producing a first signal when said picture-taking lens is within said predetermined range and producing a second signal when said picture-taking lens is outside said predetermined range;
 (4) drive means responsive to said first and second signals of said range detecting means and the output of said focus detecting means to drive said picture-taking lens, said drive means, when it receives said first signal, driving said picture-taking lens to the in-focus position on the basis of the output of said focus detecting means and, when it receives said second signal, driving said picture-taking lens over said entire movement range until it enters into said predetermined range;
 (5) contrast detecting means for detecting the contrast of the object image by said picture-taking lens and producing a low contrast signal when the contrast is low and producing a high contrast signal when the contrast is high; and
 (6) blocking means for blocking the driving of said picture-taking lens by said drive means when said picture-taking lens has been driven over at least said entire movement range on the basis of said second signal or when both of said first signal and said low contrast signal have been produced.

11. A camera according to claim 10, further including brightness detecting means for detecting the brightness of said object image and wherein said blocking means is responsive to the output of said brightness detecting means to block said driving when said brightness is below a predetermined value.

* * * * *